United States Patent [19]
Shimada

[11] Patent Number: 6,067,359
[45] Date of Patent: May 23, 2000

[54] PN SEQUENCE GENERATOR WITH BIDIRECTIONAL SHIFT REGISTER AND EULERIAN-GRAPH FEEDBACK CIRCUIT

[75] Inventor: Michio Shimada, Tokyo, Japan

[73] Assignee: NEC Corporation, Tokyo, Japan

[21] Appl. No.: 09/082,029

[22] Filed: May 21, 1998

[30] Foreign Application Priority Data

May 21, 1997 [JP] Japan .................................... 9-146072

[51] Int. Cl.⁷ ...................................................... H04K 1/00
[52] U.S. Cl. .............................................. 380/46; 380/212
[58] Field of Search ............................. 380/287, 59, 268, 380/42, 35, 36, 46; 708/252

[56] References Cited

U.S. PATENT DOCUMENTS

| | | | |
|---|---|---|---|
| 4,596,898 | 6/1986 | Pemmaraju | 178/22.16 |
| 5,105,376 | 4/1992 | Pedron | 364/717 |
| 5,170,431 | 12/1992 | Dawson et al. | 380/23 |
| 5,570,307 | 10/1996 | Takahashi | 364/717 |
| 5,864,665 | 1/1999 | Tran | 395/187.01 |

OTHER PUBLICATIONS

Tan et al., "Generation of periodic sequences using shift register and ROM", *Proc. IREE Monitor*, vol. 37, No. 7, Jul. 1976, pp. 231–232.

Pangratz et al., "Pseudo–Random Number Generator Based on Binary and Quinary Maximal–Length Sequences", *IEEE Transactions on Computers*, vol. C–28, No. 9, Sep. 1979, pp. 637–642.

Goode, "designing SRG counters to your needs", *EDN Electrical Design News*, vol. 16, No. 6, Mar. 15, 1971, pp. 10–17.

*Primary Examiner*—Tod R. Swann
*Assistant Examiner*—Todd Jack
*Attorney, Agent, or Firm*—Sughrue, Mion, Zinn, Macpeak & Seas, PLLC

[57] ABSTRACT

A pseudorandom number sequence generator comprises a bidirectional shift register arranged to be loaded with a multi-bit sequence. The shift register is responsive to an ith clock pulse and an ith direction control bit for shifting the multi-bit sequence in one of two directions, delivering an ith output bit and receiving an ith input bit. The multi-bit sequence successively defines one of nodes of an Eulerian graph connected by branches. A feedback circuit is connected to the shift register for converting a set of input data to a set of output data. The input data comprises a multi-bit sequence stored in the shift register in response to an (i+1)th clock pulse, the ith output bit and the ith direction control bit and the output data comprises an (i+1)th input bit and an (i+1)th direction control bit. The output data is supplied to the shift register so that multi-bit sequences produced by the shift register move around the graph following every branch exactly once, and outputting the (i+1)th input bit to form a pseudorandom number sequence.

7 Claims, 7 Drawing Sheets

| PO | SI |
|-----|-----|
| 000 | 1 |
| 001 | 0 |
| 010 | 0 |
| 011 | 1 |
| 100 | 1 |
| 101 | 0 |
| 110 | 1 |
| 111 | 0 |

LEGEND:
R = "1"
L = "0"

| INPUTS OF ROM 17 | | | | OUTPUTS OF ROM 17 | |
|---|---|---|---|---|---|
| CLOCK (i) | | CLOCK (i) | | CLOCK (i+1) | |
| PO | SI | SO | DIR | PO | SI | DIR |

| PO | SI | SO | DIR | PO | SI | DIR |
|---|---|---|---|---|---|---|
| 001 | 0 | 1 | R | 000 | 1 | R |
| 100 | 0 | 1 | L |  | 1 | L |
| 011 | 0 | 1 | R | 001 | 0 | L |
| 100 | 1 | 1 | L |  | 0 | R |
| 010 | 0 | 0 | R |  | 1 | L |
| 000 | 1 | 0 | L |  | 1 | R |
| 101 | 0 | 1 | L | 010 | 0 | L |
| 001 | 0 | 0 | L |  | 1 | L |
| 101 | 0 | 1 | R |  | 0 | R |
| 100 | 0 | 0 | R |  | 1 | R |
| 111 | 0 | 1 | R | 011 | 0 | L |
| 101 | 1 | 1 | L |  | 0 | R |
| 110 | 0 | 0 | R |  | 1 | L |
| 001 | 1 | 0 | L |  | 1 | R |
| 000 | 1 | 0 | R | 100 | 1 | R |
| 010 | 0 | 0 | L |  | 1 | L |
| 110 | 0 | 1 | L |  | 0 | L |
| 001 | 1 | 1 | R |  | 0 | R |
| 110 | 1 | 1 | L | 101 | 1 | L |
| 010 | 1 | 0 | L |  | 0 | L |
| 011 | 1 | 1 | R |  | 1 | R |
| 010 | 1 | 0 | R |  | 0 | R |
| 100 | 1 | 0 | R | 110 | 1 | R |
| 011 | 0 | 0 | L |  | 1 | L |
| 111 | 0 | 1 | L |  | 0 | L |
| 101 | 1 | 1 | R |  | 0 | R |
| 110 | 1 | 0 | R | 111 | 0 | R |
| 011 | 1 | 0 | L |  | 0 | L |

LEGEND:
R = "1"
L = "0"

| CLOCK (i) | | | | CLOCK (i+1) | | | | |
|---|---|---|---|---|---|---|---|---|
| PO | SI | SO | DIR | INPUTS OF ROM's 30, 31 (PO) | OUTPUT OF ROM 30 | OUTPUT OF ROM 31 | SI | DIR |
| 001<br>100 | 0<br>0 | 1<br>1 | R<br>L | 000 | 0 | 0 | 1<br>1 | R<br>L |
| 011<br>100<br>010<br>000 | 0<br>1<br>0<br>1 | 1<br>1<br>0<br>0 | R<br>L<br>R<br>L | 001 | 1 | 1 | 0<br>0<br>1<br>1 | L<br>R<br>L<br>R |
| 101<br>001<br>101<br>100 | 0<br>0<br>0<br>0 | 1<br>0<br>1<br>0 | L<br>L<br>R<br>R | 010 | 1 | 0 | 0<br>1<br>0<br>1 | L<br>L<br>R<br>R |
| 111<br>101<br>110<br>001 | 0<br>1<br>0<br>1 | 1<br>1<br>0<br>0 | R<br>L<br>R<br>L | 011 | 1 | 1 | 0<br>0<br>1<br>1 | L<br>R<br>L<br>R |
| 000<br>010<br>110<br>001 | 1<br>0<br>0<br>1 | 0<br>0<br>1<br>1 | R<br>L<br>L<br>R | 100 | 1 | 0 | 1<br>1<br>0<br>0 | R<br>L<br>L<br>R |
| 110<br>010<br>011<br>010 | 1<br>1<br>1<br>1 | 1<br>0<br>1<br>0 | L<br>L<br>R<br>R | 101 | 0 | 0 | 1<br>0<br>1<br>0 | L<br>L<br>R<br>R |
| 100<br>011<br>111<br>101 | 1<br>0<br>0<br>1 | 0<br>0<br>1<br>1 | R<br>L<br>L<br>R | 110 | 1 | 0 | 1<br>1<br>0<br>0 | R<br>L<br>L<br>R |
| 110<br>011 | 1<br>1 | 0<br>0 | R<br>L | 111 | 0 | 0 | 0<br>0 | R<br>L |

6,067,359

1

PN SEQUENCE GENERATOR WITH BIDIRECTIONAL SHIFT REGISTER AND EULERIAN-GRAPH FEEDBACK CIRCUIT

BACKGROUND OF THE INVENTION

1. Field of the Invention

The present invention relates generally to pseudorandom number sequence generators, and more specifically to a pseudorandom number sequence generator, or nonlinear feedback shift register, suitable for producing stream ciphers.

2. Description of the Related Art

Stream ciphers are used to scramble important data to protect it from being tapped or tampered with by unauthorized attempts. Nonlinear feedback shift registers are most often used to produce a pseudorandom number (PN) sequence. Details of this type of nonlinear feedback shift register are described in "Analysis and Design of Stream Ciphers", R. A. Rueppel, Springer-Verlag, 1986. The prior art nonlinear feedback shift register is based on a Hamiltonian graph which is concerned with the possibility of travelling around a graph, going along branches (edges) in such a way as to visit every node (vertex) exactly once. Usually, a trial-and-error method is used to discover a Hamiltonian cycle if the shift register has a small number of stages. However, the trial-and-error method is impractical for a shift register if it is required to produce a PN sequence of long period. In addition, if a Hamiltonian cycle were found, the resultant PN sequence would contain a substantially equal number of 0's and 1's which cannot be logically compressed for implementation of simple circuitry.

SUMMARY OF THE INVENTION

It is therefore an object of the present invention to provide a PN sequence generator that can be designed with ease and implemented by simple circuitry so that it produces PN sequences of desired periods.

To obtain this object, the present invention is based on the Eulerian graph which is concerned with the possibility of travelling around a graph, going along branches (edges) in such a way as to use every branch exactly once.

According to a first aspect of the present invention, there is provided a pseudorandom number sequence generator comprising a bidirectional shift register arranged to be loaded with a multi-bit sequence, the shift register being responsive to an ith clock pulse and an ith direction control bit for shifting the multi-bit sequence in one of two directions, delivering an ith output bit and receiving an ith input bit, wherein the multi-bit sequence successively defines one of a plurality of nodes of a graph connected by branches. A feedback circuit is provided, which is connected to the shift register for converting a set of input data comprising a multi-bit sequence stored in the shift register in response to an (i+1)th clock pulse, the ith output bit and the ith direction control bit to a set of output data comprising an (i+1)th input bit and an (i+1)th direction control bit and supplying the output data to the shift register so that multi-bit sequences move around the graph following every branch exactly once, and outputting the (i+1)th input bit to form a pseudorandom number sequence.

According to a second aspect, the present invention provides a method of generating a pseudorandom number sequence, comprising the steps of loading a multi-bit sequence into a bidirectional shift register. Responsive to an ith clock pulse, the multi-bit sequence is shifted by one bit

2 position in one of two directions according to an ith direction control bit, an ith output bit is delivered from the shift register and an ith input bit is supplied to the shift register, the ith output bit and the ith direction control bit are stored. The multi-bit sequence in the shift register successively defines one of a plurality of nodes of a graph connected by branches. Responsive to an (i+1)th clock pulse, a set of input data is formed, which comprises the ith output bit, the ith direction control bit and a multi-bit sequence stored in the shift register. Responsive to the (i+1)th clock pulse, the set of input data is converted to a set of output data comprising an (i+1)th input bit and an (i+1)th direction control bit, shifting the multi-bit sequence along the shift register by one bit position in one of two directions according to the (i+1)th direction control bit, and supplying the (i+1)th input bit to the shift register, and holding an (i+1)th output bit delivered from the shift register and the (i+1)th direction control bit, so that multi-bit sequences move around the graph following every branch exactly once, and outputting the (i+1)th input bit to form a pseudorandom number sequence.

BRIEF DESCRIPTION OF THE DRAWINGS

The present invention will be described in further detail with reference to the accompanying drawings, in which.

DETAILED DESCRIPTION

Figure 1:
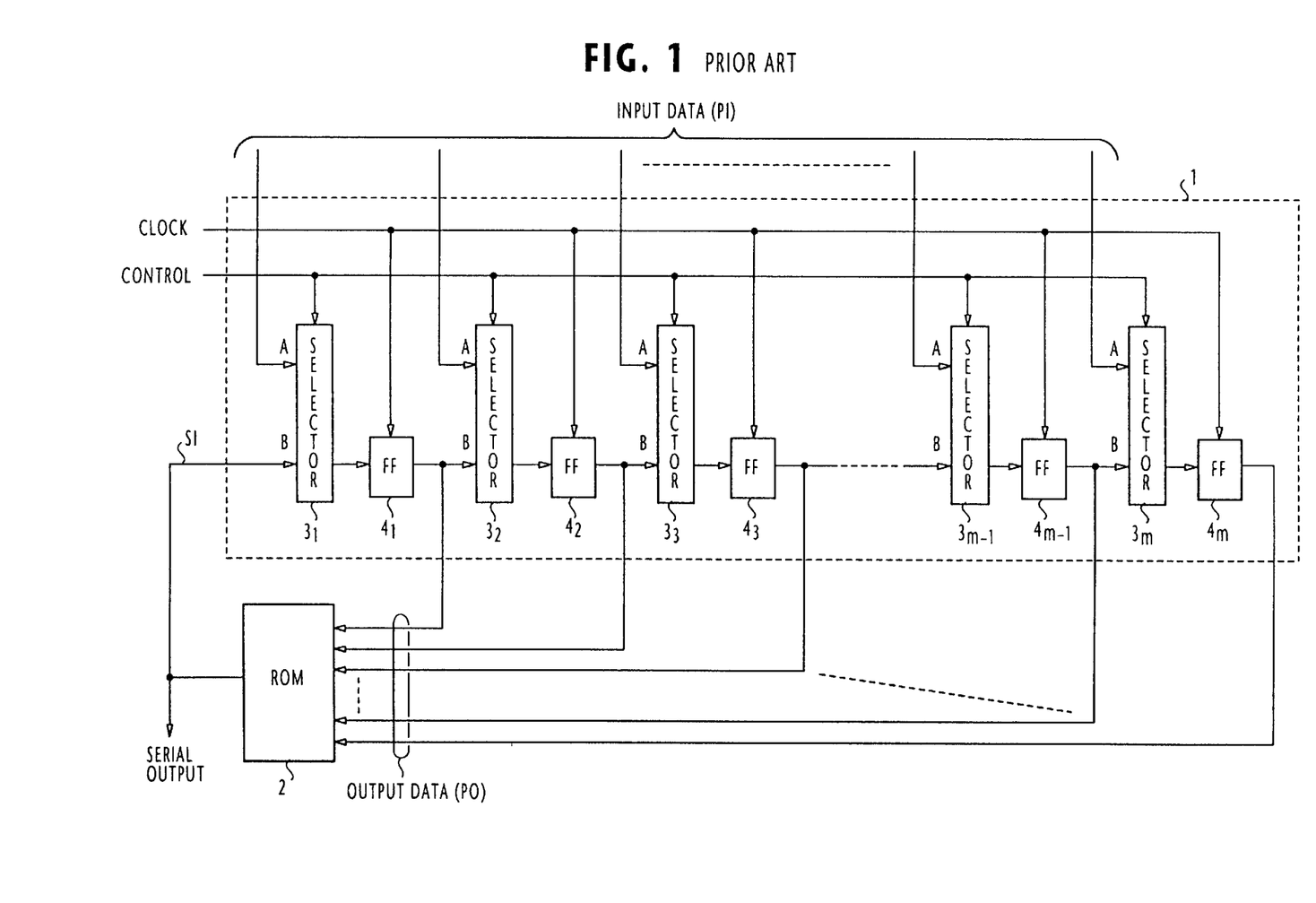
FIG. 1 is a block diagram of a prior art pseudorandom number sequence generator.
Figures 2, 3:
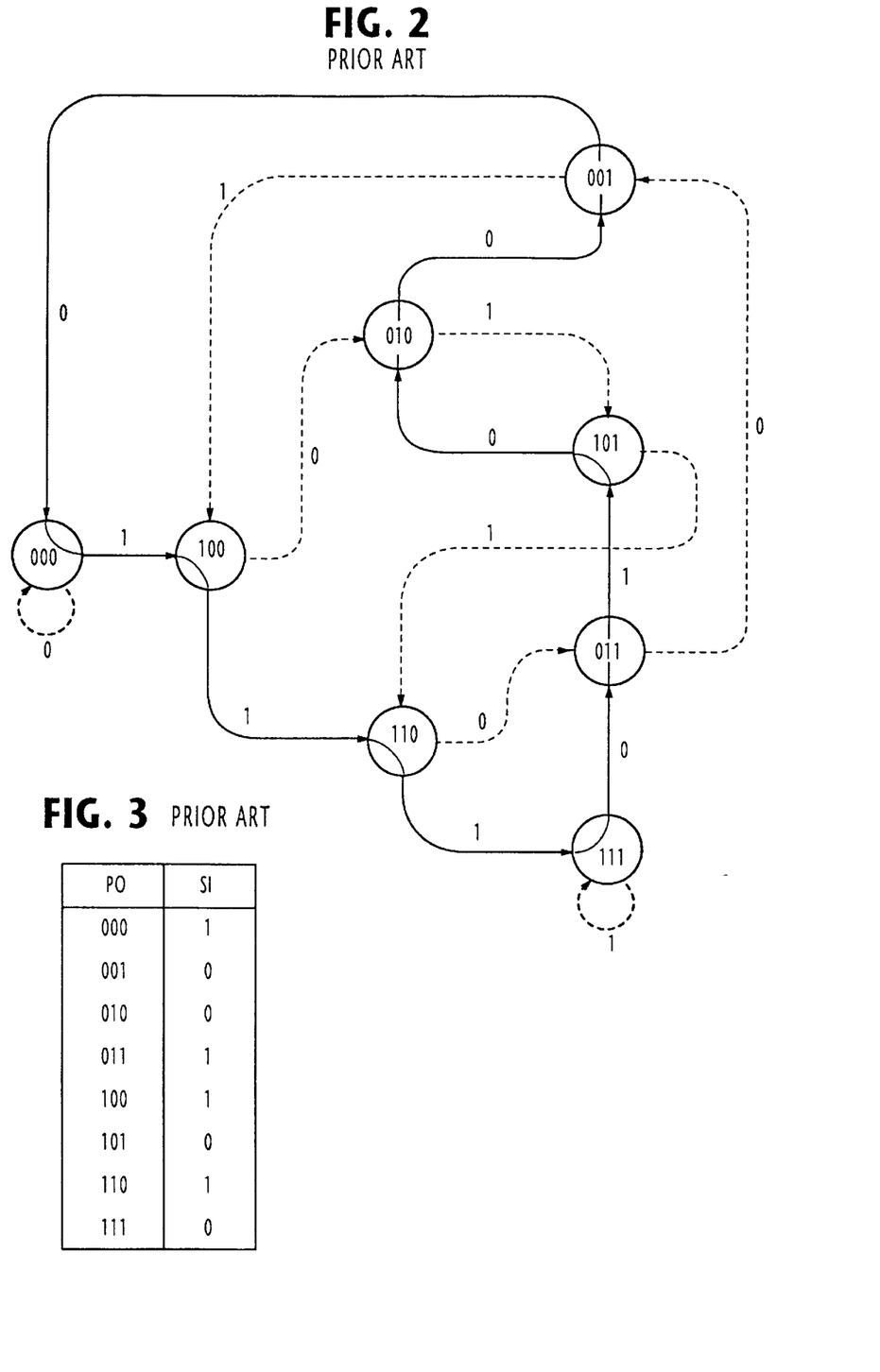
FIG. 2 is a state transition graph of a 3-stage shift register of FIG. 1.
FIG. 3 is an illustration of contents of the ROM of FIG. 1 according to the graph of FIG. 2.

Before proceeding with the detailed description of the present invention, it may be helpful to provide an explanation of a prior art nonlinear feedback shift register with reference to FIGS. 1 to 3. The prior art nonlinear feedback shift register has an m-stage shift register 1 and a function generator which is implemented by a read-only memory 2. Shift register 1 includes selectors $3_1$ to $3_m$ and flip-flops $4_1$ to $4_m$ alternately connected in a series circuit so that the output of the selector of each stage is connected to the data input of the flip-flop of the same stage. Each selector has two input data terminals A and B.

Individual bits of multi-bit input data (PI) are supplied to the data terminals A of selectors $3_1$ to $3_m$. The output of the flip-flop of each stage is connected to the B terminal of the selector of the next stage. Shift register 1 produces multi-bit parallel output data (PO) from the outputs of the flip-flops $4_1$ to $4_m$. The ROM 2 is supplied with this output data PO to convert its parallel bit pattern to a single data bit. The output of the ROM represents a pseudo-random number which is supplied to the B terminal of the selector $3_1$ of the first stage as serial input data (SI) as well as to an external utilization circuit, not shown.

Selectors $3_1$ to $3_m$ respond to a logic-0 control signal for selecting the signal at their terminal A and respond to a logic-1 control signal for selecting the signal at their terminal B. Flip-flops $4_1$ to $4_m$ are driven by clock pulses so that they hold the selected data bits in response to a clock pulse and shift them along to the succeeding flip-flops in response to the next clock pulse. The bit sequence stored in the flip-flops $4_1$ to $4_m$ at a particular instant represents an internal state of the shift register of that instant. With the control signal being at logic level 0, the multi-bit parallel input PI is loaded into the flip-flops as an initial internal state of the shift register in response to a clock pulse. When the control signal is at logic level 1, the internal state of the shift register changes when the flip-flops are clocked so that their outputs are shifted to the next by one bit and a new input bit is supplied to the shift register.

The internal state of the shift register 1 varies and the way it changes is a process of selecting one of all possible bit sequences, FIG. 2 is a state transition graph illustrating all possible internal states of a 3-stage shift register of the prior arc. The three-digit number in each circle represents one of all possible internal states of the shift register. Solid and broken lines indicates all possible branches that can occur. The arrowheads attached to the solid and broken lines indicate a change from a given state to the next when logic level 0 or 1 is entered to die given state as an input bit SI to the shift register and one-bit shifted to the right. For example, state 000 changes to state 100 when a "1" is entered to its leftmost bit position and all three bits are one-bit shifted to the right. If 0 and 1 are entered to state 000 and state 111, respectively, the internal state of the shift register does not change at all.

According to graph theory, the circles of FIG. 2 correspond to nodes of a graph and all lines correspond to branches. Design of a nonlinear feedback shift register is reduced to the determination of a Hamiltonian cycle, i.e., a cycle chat begins with a starting node and passes every node (vertex) only once in its way back to the starting node. In FIG. 2, the solid lines indicate the paths followed by the Hamiltonian cycle.

FIG. 3 shows a conversion table implemented by the ROM 2 for mapping one-bit input data (SI) to 3-bit output data (PO) in the case of the 3-bit shift register of FIG. 2 whose internal state changes according to an Hamiltonian cycle. A sequence of pseudorandom numbers "11101000" is repeatedly produced by the ROM 2.

Although a Hamiltonian cycle can be easily discovered in such a simplified example using a trial-and-error method, this method is impractical if the number of nodes is increased in order to maximize the period of a pseudorandom number sequence. In addition, if a Hamiltonian cycle were found, the resultant PN sequence would contain a substantially equal number of 0's and 1's which cannot be logically compressed for implementation of simple circuitry.

The present invention is based on the Eulerian graph which is concerned with the possibility of travelling around a graph, going along branches (edges) in such a way as to use every branch exactly once. More precisely, if each node of a graph has two or four branches emanating from it, there exists a path in the graph that passes every branch exactly once. It is well known that discovery of such a path is simple.

Figure 4:
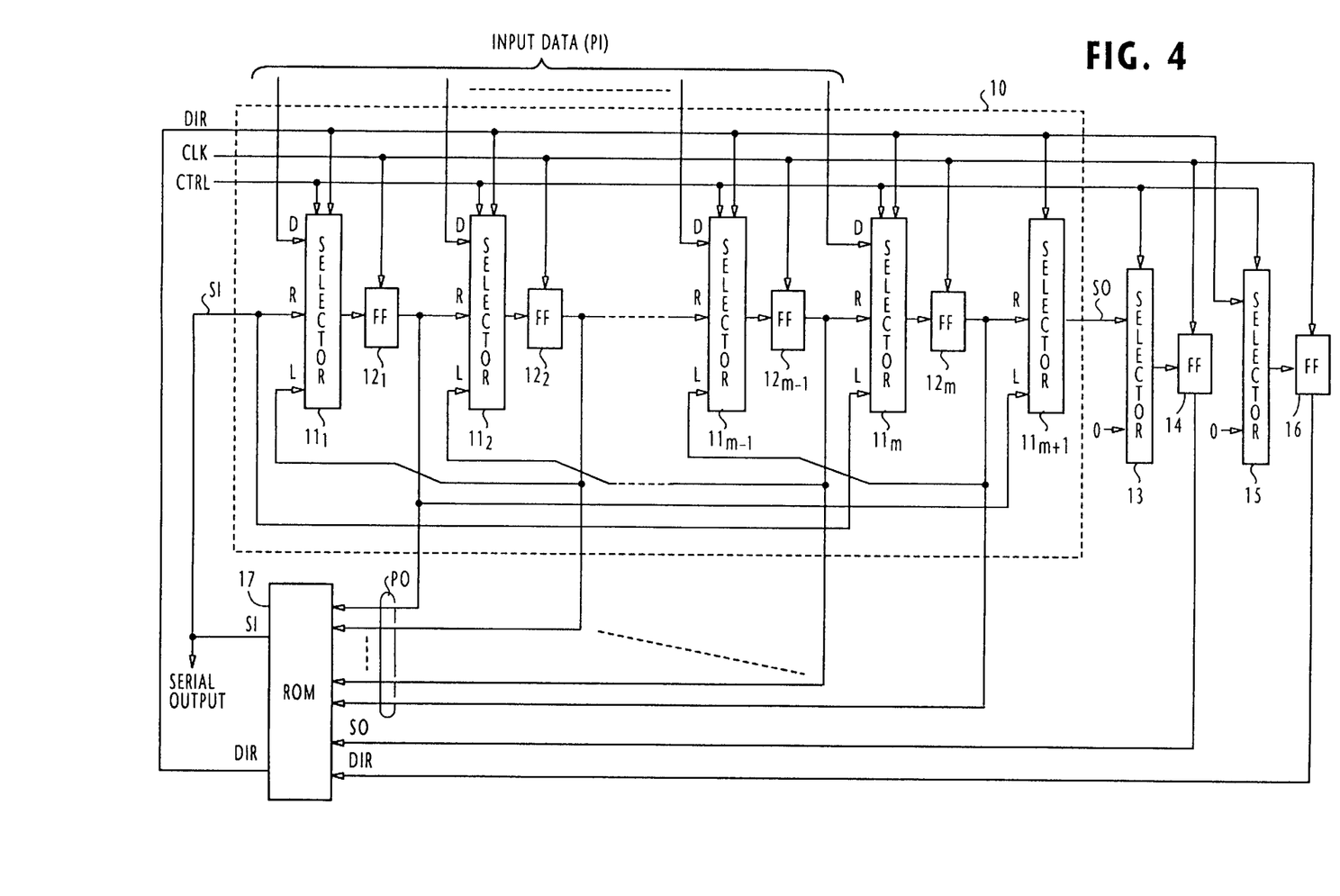
FIG. 4 is a block diagram of a pseudorandom number sequence generator according to one embodiment of the present invention.

In FIG. 4, a pseudorandom number sequence generator according to one embodiment of the present invention is illustrated. The PN sequence generator of this invention comprises a bidirectional shift register 10 having "m" stages of selectors 11 and flip-flops 12 and an additional selector $11_{m+1}$. Each of selectors $11_1$ to $11_m$ has three data input terminals D, R and L. For each selector, the data terminal D is a terminal for receiving an individual bit of an input bit sequence PI except for all 0's and all 1's, the terminal R for receiving an input bit from a left-side stage when the shift register is one-bit shifted to the right, and the terminal L for receiving an input bit from a right-side stage when the shift register is one-bit shifted to the left.

The outputs of flip-flops $12_1$ to $12_{m-1}$ are connected to the terminal R of the selectors $11_2$ to $11_m$, respectively, and the outputs of flip-flops $12_2$ to $12_m$ are connected to the terminal L of the selectors $11_1$ to $11_{m-1}$, respectively. The output of flip-flop $12_1$ is connected to the terminal R of selector $11_2$ and to the terminal L of selector $11_{m+1}$ and the serial data input SI is supplied to the terminal L of selector $11_m$ as well as to the terminal R of selector $11_1$.

Direction control signal (DIR) and mode control signal (CTRL) are supplied to the selectors $11_1$ to $11_m$. Selector $11_{m+1}$ responds only to the direction control signal for receiving the output of flip-flop $12_m$ or flip-flop $12_1$ to produce a serial output bit SO.

When the mode control signal CTRL is "0", the multi-bit input sequence PI is loaded into the flip-flops $12_1$ to $12_m$, in response to a clock pulse. When the control signal CTRL is "1" and the direction control signal DIR is "1", the shift register 10 causes its internal state to move one bit position to the right in response to a dock pulse, delivering the rightmost bit as an output bit SO from the flip-flop $12_m$ to the selector $11_{m+1}$ and receiving an input bit SI from a function generator, or ROM 17 at the terminal R of selector $11_1$. With CTR L=1 and DIR=0, the shift register causes its internal state to move one bit position to the left in response to a clock pulse, delivering the leftmost bit as an output bit SO from the flip-flop $12_1$ to the selector $11_{m+1}$ and receiving an input bit SI from the ROM 17 at the terminal L of selector $11_m$.

A selector 13 is provided to respond to a logic-1 level of the mode control signal CTRL for applying the output of selector $11_{m+1}$ to a flip-flop 14 or applying a "0" bit when the control signal is at logic level 0. With the control signal CTRL being at logic level 1, the flip-flop 14 holds the output of selector 13 as the leftmost or rightmost bit of a previous state of the shift register 10.

Further provided is a selector 15 which responds to a logic-1 level of the mode control signal CTRL for applying the direction control signal DIR to a flip-flop 16 or applying to it a "0" bit when CTRL is 0. With the control signal CTRL being at logic-1, the flip-flop 16 holds the output of selector 15 as an indication of the direction in which the internal state of the shift register was shifted during the previous clock period.

The outputs of flip-flops $11_1$ to $11_m$ are supplied to a mapping table created in a ROM 17 as parallel output data PO and the outputs of flip-flops 14 and 16 are supplied to the ROM 17 as representative of the data SO and DIR of the previous state. ROM 17 provides mapping of the PO, SO and DIR inputs to output bits SI and DIR. The SI output of ROM 17 is coupled to the selectors $11_1$ and $11_m$ and the DIR output is used to control the selectors $11_1$ to $11_{m+1}$.

Figure 5:
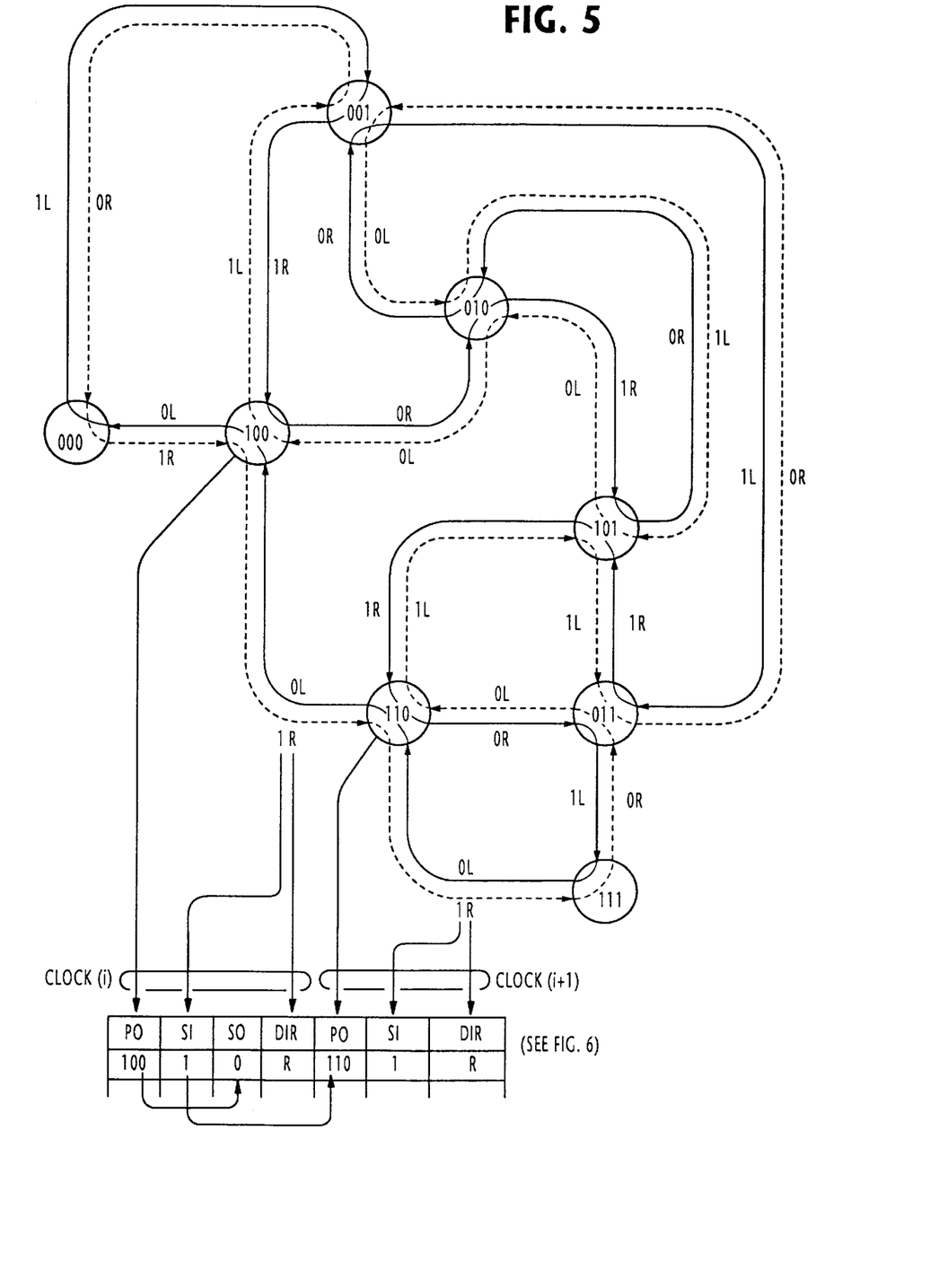
FIG. 5 is a state transition graph of a 3-stage bidirectional shift register of FIG. 4.

FIG. 5 is a state transition graph of the bidirectional shift register 10 of FIG. 4 when it is implemented as a 3-stage shift register. Since all nodes, except for two-branch nodes 111 and 000, have four branches, Eulerian cycles do exist in the graph. One Eulerian cycle is indicated by solid and broken lines which respectively represent the rightward and leftward directions of the shift register. By travelling around the graph, starting with node 000, it can be seen that every branch is used exactly once to find a return path to the starting node. The arrowheads attached to the solid and broken lines indicate a change from a node to the next when logic level 0 or 1 is entered to the node as an input bit SI to the shift register and one-bit shifted in a direction indicated by the characters "R" and "L" attached to the logic levels "1" and "0". For example, node 100 changes to node 110 when all three bits are one-bit shifted to the right in response to an ith clock pulse, producing an output SO=0, and an input SI=1 is entered to its leftmost bit position, and node 110 changes to node 111 when all three bits are one-bit shifted to the right in response to an (i+1)th clock pulse and an input SI=1 is entered to its leftmost bit position.

Figure 6:
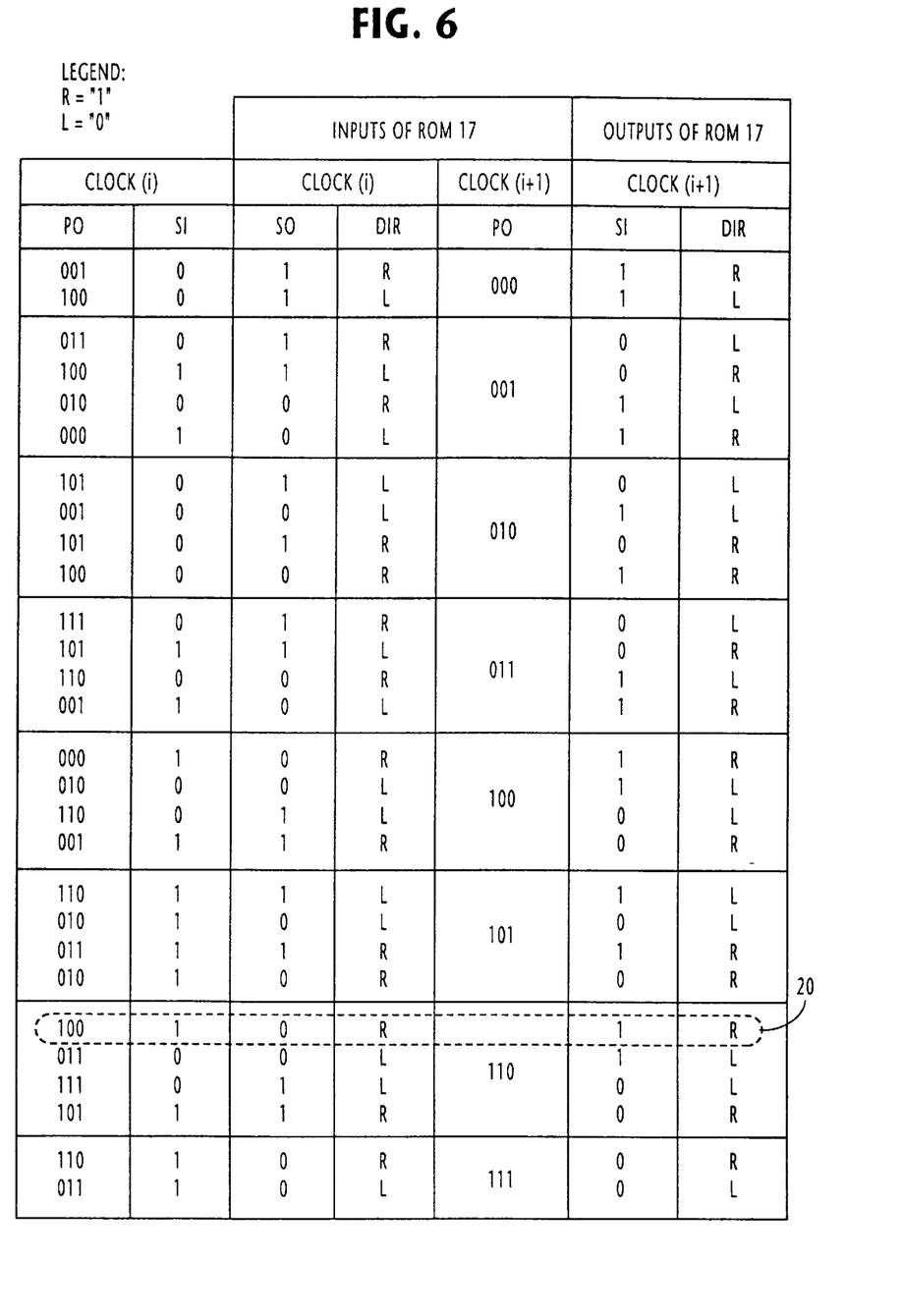
FIG. 6 is an illustration of contents of the ROM of FIG. 4 according to the graph of FIG. 5.

The data SO and DIR of the ith clock period and the data PO of the (i+1)th clock period are mapped in the ROM 17 to the data SI and DIR of the (i+1)th clock period as illustrated in FIG. 6. The input and output data associated with the transition from state 100 to state 110 are enclosed by a broken-line 20 in FIG. 6. This part of FIG. 6 is repeated in FIG. 5 to illustrate the relations of its contents to the associated nodes and branches.

Figure 7:
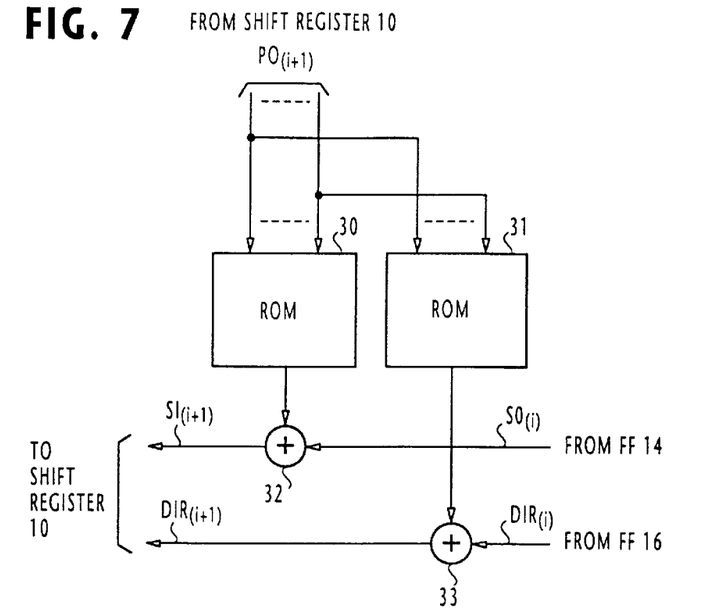
FIG. 7 is a block diagram of a modified embodiment of this invention.

The embodiment of FIG. 4 can be modified as shown in FIG. 7 in which the ROM 17 of FIG. 4 is replaced with a pair of first and second function generators, or ROMs 30 and 31 and a pair of modulo-2 adders 32 and 33. Each of the ROMs 30 and 31 receives the multi-bit parallel output data PO from the bidirectional shift register 10. If the shift register 10 is a 3-stage register which finds an Eulerian path as indicated in FIG. 6, then the ROMs 30 and 31 can be implemented in such a way as to map the 3-bit input parallel data PO to binary outputs as shown in FIG. 8.

Figure 8:
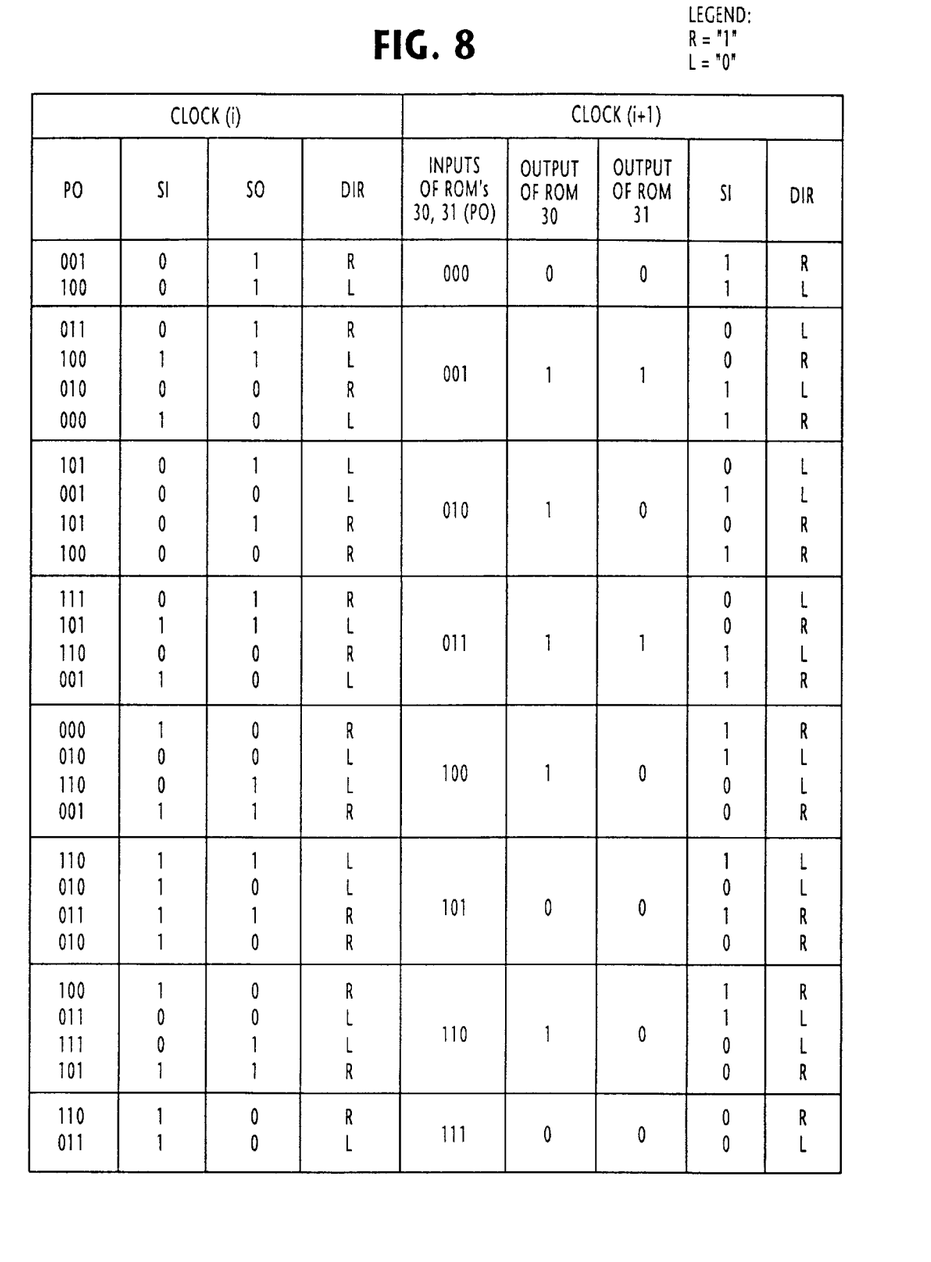
FIG. 8 is an illustration of contents of the ROMs of FIG. 7 according to the graph of FIG. 5.

The outputs of ROMs 30 and 31 are summed with the SO and DIR outputs of flip-flops 14 and 16, respectively, in modulo-2 adders 32 and 33 to produce output bits SI and DIR as shown in FIG. 8. Shift register 10 receives these outputs of the modulo-2 adders 32 and 33 as new input data. It is seen from FIG. 8 that the modulo-2 summation of the SO and DIR inputs of the ith clock period with the outputs of the ROMs 30, 31 produces the same SI and DIR outputs during the (i+1)th clock period as those of FIG. 6.

This modified embodiment is advantageous in that the amount of data mapped in memories 30 and 31 can be significantly reduced in comparison with the amount of data in ROM 17.

Since the outputs of ROMs 30 and 31 can be respectively represented as SI(s) and DIR(s) for a given internal state "S" of the bidirectional shift register 10, the following relations apply to any Eulerian cycles:

$$SI_{(i+1)} = SI_{(i)} \oplus SI(s) \quad (1)$$

$$DIR_{(i+1)} = DIR_{(i)} \oplus DIR(s) \quad (2)$$

where the symbol ⊕ indicates the modulo-2 addition. These relations hold true to the relationships mapped in the ROM 17 of the previous embodiment.

Figure 9:
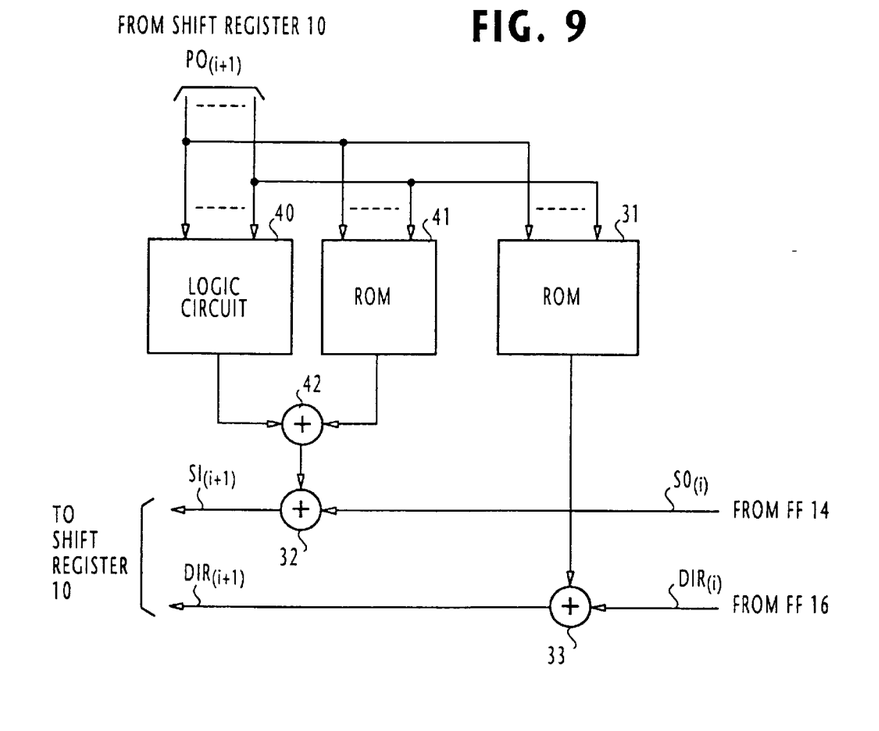
FIG. 9 is a block diagram of a further modification of this invention.

A further modification of the present invention is shown in FIG. 9 in which a main function generator, or logic circuit 40, an auxiliary function generator, or ROM 41 and a modulo-2 adder 42 are provided instead of the ROM 30 of FIG. 7. Logic circuit 40 transforms the multi-bit data PO from the shift register 10 into a single bit output according to a predefined, main function. Memory 41 transforms the multi-bit data PO into a single bit output according to a predefined, auxiliary function which serves to correct errors in the main function. The outputs of logic circuit 40 and memory 41 are summed in the modulo-2 adder 42 and the output of the adder 42 is supplied to the modulo-2 adder 32.

Prior to selecting an Eulerian path, the main function is determined in a brute-force approach so that the logic circuit 40 can be implemented as simple as possible. An Eulerian path is then selected in such a way that the ROMs 41 and 31 produce as many logic-0 outputs as possible. If the outputs of these memories contain many logic-0 outputs, they can be logically compressed to reduce the memory size. In this case, the ROMs 41 and 31 can be implemented with simplified logic circuits. Since $3^{2m-2}$ Eulerian paths are known to exist in a state transition graph of an m-stage directional shift register, the probability of finding an Eulerian path that satisfies the above-mentioned relations is high.

What is claimed is:

1. A pseudorandom number sequence generator comprising:

a bidirectional shift register arranged to be loaded with a multi-bit sequence, the shift register being responsive to an ith clock pulse and an ith direction control bit for shifting the multi-bit sequence in one of two directions, delivering an ith output bit and receiving an ith input bit, wherein the multi-bit sequence successively defines one of a plurality of nodes of a graph connected by branches; and a feedback circuit connected to the shift register for converting a set of input data comprising a multi-bit sequence stored in the shift register in response to an (i+1)th clock pulse, the ith output bit and the ith direction control bit to a set of output data comprising an (i+1)th input bit and an (i+1)th direction control bit and supplying the output data to the shift register so that multi-bit sequences move around the graph following every branch exactly once, and outputting the (i+1)th input bit to form a pseudorandom number sequence.

2. A pseudorandom number sequence generator as claimed in claim 1, wherein said function generator comprises a memory for mapping all possible bit patterns of said multi-bit sequence and all possible bit patterns of the output bits of the first and second flip-flops to a plurality of pairs of an input bit and a direction control bit.

3. A pseudorandom number sequence generator comprising:

a bidirectional shift register arranged to be loaded with a multi-bit sequence, the shift register being responsive to an ith clock pulse and an ith direction control bit for shifting the multi-bit sequence in one of two directions, delivering an ith output bit and receiving an ith input bit, wherein the multi-bit sequence successively defines one of a plurality of nodes of a graph connected by branches;

a first flip-flop responsive to the ith clock pulse for storing the ith output bit and responsive to an (i+1)th clock pulse for delivering the stored ith output bit;

a second flip-flop responsive to the ith dock pulse for storing the ith direction control bit and responsive to the (i+1)th clock pulse for delivering the stored ith direction control bit; and a function generator connected to the shift register and the first and second flip-flops for forming a set of input data comprising a multi-bit sequence stored in the shift register in response to the (i+1)th clock pulse, the ith output bit and the ith direction control bit delivered from the first and second flip-flops to a set of output data comprising an (i+1)th input bit and an (i+1)th direction control bit and supplying the (i+1)th input bit and the (i+1)th direction control bit to the shift register so that multi-bit sequences move around the graph following every branch exactly once, and outputting the (i+1)th input bit to form a pseudorandom number sequence.

4. A pseudorandom number sequence generator as claimed in claim 3, wherein said function generator comprises:
- a first function generator for receiving said multi-bit sequence from said shift register and producing an output bit;
- a second function generator for receiving said multi-bit sequence from said shift register and producing an output bit;
- a first modulo-2 adder for summing the output bit of the first function generator with the output bit of the first flip-flop to produce said (i+1)th input bit; and
- a second modulo-2 adder for summing the output bit of the second function generator with the direction control bit of the second flip-flop to produce said (i+1)th direction control bit.

5. A pseudorandom number sequence generator as claimed in claim 4, wherein said first function generator comprises:
- a main function generator for receiving said multi-bit sequence from said shift register and producing an output bit;
- an auxiliary function generator for receiving said multi-bit sequence from said shift register and producing an output bit; and
- a modulo-2 adder for summing the output bit of the main function generator with the output bit of the auxiliary function generator.

6. A pseudorandom number sequence generator as claimed in claim 3, wherein said first function generator comprises a memory for mapping all possible bit patterns of said multi-bit sequence to a plurality of output bits and wherein said second function generator comprises a memory for mapping all possible bit patterns of said multi-bit sequence to a plurality of output bits.

7. A method of generating a pseudorandom number sequence, comprising:
a) loading a multi-bit sequence into a bidirectional shift register;
b) responsive to an ith clock pulse, shifting the multi-bit sequence by one bit position in one of two directions according to an ith direction control bit, delivering an ith output bit from the shift register and supplying thereto an ith input bit, storing the ith output bit and the ith direction control bit, wherein the multi-bit sequence successively defines one of a plurality of nodes of a graph connected by branches;
c) responsive to an (i+1)th clock pulse, forming a set of input data comprising the ith output bit, the ith direction control bit and a multi-bit sequence stored in the shift register; and
d) responsive to the (i+1)th clock pulse, converting the set of input data formed by step (c) to a set of output data comprising an (i+1)th input bit and an (i+1)th direction control bit, shifting the multi-bit sequence along the shift register by one bit position in one of two directions according to the (i+1)th direction control bit, and supplying the (i+1)th input bit to the shift register, and holding an (i+1)th output bit delivered from the shift register and the (i+1)th direction control bit, so that multi-bit sequences move around the graph following every branch exactly once, and outputting the (i+1)th input bit to form a pseudorandom number sequence.

* * * * *